United States Patent
Dai (10) Patent No.: US 9,491,702 B2
(45) Date of Patent: Nov. 8, 2016

(54) DISCONTINUOUS RECEPTION DYNAMIC CONFIGURATION METHOD, TERMINAL AND BASE STATION

(71) Applicant: ZTE CORPORATION, Shenzhen (CN)

(72) Inventor: Qian Dai, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 71 days.

(21) Appl. No.: 14/398,228

(22) PCT Filed: May 7, 2013

(86) PCT No.: PCT/CN2013/075252
§ 371 (c)(1),
(2) Date: Oct. 31, 2014

(87) PCT Pub. No.: WO2013/166953
PCT Pub. Date: Nov. 14, 2013

(65) Prior Publication Data
US 2015/0131505 A1    May 14, 2015

(30) Foreign Application Priority Data
May 10, 2012 (CN) .......................... 2012 1 0143397

(51) Int. Cl.
G08C 17/00 (2006.01)
H04W 52/02 (2009.01)
H04W 16/10 (2009.01)
H04W 76/04 (2009.01)

(52) U.S. Cl.
CPC ......... *H04W 52/0225* (2013.01); *H04W 16/10* (2013.01); *H04W 52/0216* (2013.01); *H04W 76/048* (2013.01); *Y02B 60/50* (2013.01)

(58) Field of Classification Search
CPC ....................................................... H04Q 7/28
USPC .......................... 370/311–347; 455/466, 547
See application file for complete search history.

(56) References Cited

U.S. PATENT DOCUMENTS

| 2008/0167089 A1 | 7/2008 | Suzuki et al. |
| 2009/0232054 A1 | 9/2009 | Wang et al. |
| 2010/0184458 A1 | 7/2010 | Fodor et al. |

FOREIGN PATENT DOCUMENTS

| CN | 101111051 A | 1/2008 | |
| CN | 102143565 A | 8/2011 | |
| EP | 2 157 830 | 2/2010 | |
| EP | 2157830 A1 * | 2/2010 | .......... H04W 76/048 |
| JP | 2011-520341 | 7/2011 | |
| WO | WO2012/013215 A1 | 2/2012 | |
| WO | WO 2012013215 A1 * | 2/2012 | ........ H04W 72/1247 |

OTHER PUBLICATIONS

ETRI, "DRX Operation for LTE-Advanced UE", R2-096510, 3GPP TSG RAN WG2 #68, Agenda 7.3.3, Jeju, Korea (Nov. 9-13, 2009).
Research in Motion LTD, "Go to Long Sleep Command for LTE DRX", R2-081868, 3GPP TSG-RAN-WG2 Meeting #61, Agenda 5.1.1.3, Shenzhen, China (Mar. 31-Apr. 4, 2008).
China Unicom, "Consideration on DRX Configuraton for Background Traffic", R2-121429, 3GPP TSG-RAN WG2 Meeting #77bis, Jeju, South Korea (Mar. 26-30, 2012).

* cited by examiner

*Primary Examiner* — Iqbal Zaidi
(74) *Attorney, Agent, or Firm* — Pearl Cohen Zedek Latzer Baratz LLP (57) ABSTRACT

The embodiment of the present document discloses a method, terminal and base station for dynamically configuring Discontinuous Reception (DRX), which enable the base station dynamically configure a DRX short cycle with a low expense, and enable the terminal be adapted to the power saving demand for different data services. The terminal executes the following processing: receiving a DRX cycle using instruction transmitted by the base station; using a long DRX cycle if determining that the received DRX cycle using instruction is a long DRX cycle using instruction. The base station executes the following processing: when the base station determines that the UE needs to use the long DRX cycle according to data arriving regular of the terminal, transmitting the long DRX cycle using instruction to the UE. The terminal includes a receiving module and a DRX module.

16 Claims, 6 Drawing Sheets

DISCONTINUOUS RECEPTION DYNAMIC CONFIGURATION METHOD, TERMINAL AND BASE STATION

CROSS-REFERENCE TO RELATED APPLICATIONS

This application is a National Phase Application of PCT International Application No. PCT/CN2013/075252, entitled "DISCONTINUOUS RECEPTION DYNAMIC CONFIGURATION METHOD, TERMINAL AND BASE STATION", International Filing date May 7, 2013, published on Nov. 14, 2013, which in turn claims priority from Chinese Patent Application No. 201210143397.0, filed May 10, 2012, all of which are incorporated herein by reference in their entirety.

TECHNICAL FIELD

The present document relates to the wireless communication technology field, and in particular, to a method, terminal and base station for dynamically configuring Discontinuous Reception (DRX) of a terminal.

BACKGROUND

In the existing broadband wireless communication system, in order to control the power consumption of the User Equipment (UE, or referred to as terminal), the Discontinuous Reception (DRX) technology is used.

The DRX refers to that the terminal stops monitoring the Physical Downlink Control Channel (PDCCH) during a certain time. The DRX is divided into two types: one is IDLE DRX, that is, the discontinuous reception when the terminal is in the IDLE state. When being in the IDLE state, there is no Radio Resource Control (RRC) connection or the dedicated resources of the user, so the IDLE DRX is mainly used for monitoring the calling channel and the broadcast channel; so long as a fixed cycle is defined, it can achieve the purpose of the discontinuous reception. However, if the terminal monitors the user data channel, it must firstly enter the connection state from the IDLE state. Another type is the Active DRX, that is the DRX when the terminal is in the RRC-CONNECTED state, which can optimize the system resource configuration, and more important thing is that it can save the power consumption of the terminal, and it can achieve the purpose of saving the power consumption of the terminal while not need to let the terminal enter the RRC_IDLE state. For example, for some non-real-time applications (web browsing, instant messaging, etc.), there is always a certain time when the terminal does not need to uninterruptedly monitor the downlink data, and does not need to carry on the relevant processing either, and the DRX can be applied to such a scene. In addition, because there is the RRC connection under the Active DRX state, the speed that the terminal turns into the state of monitoring the downlink data is very fast.

The base station transmits the DRX configuration parameter to the UE through the RRC connection reconfiguration signaling.

There are some timers in the DRX, and these timers are described hereinafter; wherein, all time is based on the subframe, that is, ms is used as the unit:

1, continuous working timer (On Duration Timer)
the time that the terminal keeps awake after waking up from the DRX each time, and the terminal will search for the PDCCH within this cycle of time.

2, stop timer (Inactivity Timer)
the time that the terminal keeps active after successfully decoding the PDCCH originally transmitted by the Hybrid Automatic Repeat Request (HARQ) every time when the terminal is awake, that is, the time that the terminal needs to keep active after receiving the PDCCH indicating one original transmission (rather than retransmission) of the UL/DL.

3, total working timer after once waking up (Active Timer)
the total time that the terminal keeps awake after waking up from the DRX; in this time period, the terminal monitors the PDCCH, including all states causing the terminal to be Active, for example, the DRX cycle begins "On Duration", or receiving the originally transmitted PDCCH, or monitoring the retransmission, etc.

If the DRX is configured, then the Active Time includes the following time: the time that the On Duration Timer, the Inactivity Timer, the DRX Retransmission Timer and the media access control (MAC) Layer Contention Resolution Timer run; or, there is a Scheduling Request (SR) which is already transmitted to the PUCCH and is in the hanging up state (that is, the scheduling request is not satisfied); or, there is the uplink authorization for one hanging up HARQ, and there are data in the corresponding HARQ buffer; or, after the non-compete random accessing, it receives the random access response message successfully, and now there should be a PDCCH transmitted to the terminal to indicate a new transmission, but the PDCCH has not been received yet, and the terminal must be in the Active state at this moment.

4, HARQ round trip timer (HARQ RTT Timer)
the minimum interval time, expected by the terminal, that the downlink retransmission (DL Retransmission) is arrived, that is, the terminal does not need to care when the retransmission will arrive for the moment; so long as the timer is overtime, the terminal needs to be in the waking up state.

5, DRX Retransmission Timer
the time that the terminal expects to receive the DL Retransmission, that is, it needs so much time to receive the downlink retransmission.

6, DRX Cycle Length
once the DRX Cycle length is configured/reconfigured, it will be fixed, and will not change because the Active Time is greater than the On Duration.

The execution process of the existing DRX mainly includes: if the short DRX cycle is used, then it checks whether the current subframe satisfies the formulae: [(SFN*10)+subframe number] modulo (short DRX Cycle)= (DRX StartOffset) modulo (short DRX Cycle); wherein, the SFN is a system frame number, the subframe number is the number of the subframes, the short DRX Cycle is the short DRX cycle, the DRX StartOffset is the DRX starting offset, and the modulo represents modeling; if the long DRX cycle is used, then it checks whether the current subframe satisfies the formulae: [(SFN*10)+subframe number] modulo (long DRX Cycle)=DRX StartOffset; wherein, the long DRX Cycle is the long DRX cycle; when one of the above two conditions is satisfied, then it starts the On Duration Timer and at this moment the terminal starts to monitor the PDCCH. When the HARQ RTT Timer of the subframe (the shortest time of expecting retransmission) is overtime, the retransmission may come; if there are the data which are not decoded successfully (that is, the above data are failed to be received and the data need to be retransmitted) in the soft buffer of the HARQ process at this moment, then the DRX Retransmission Timer is started to start monitoring the PDCCH retransmitting associated data. If the DRX command media access control layer control information unit (the DRX command MAC CE) is received, which means that the eNB requires the terminal to enter the sleep state, and it will stop the On Duration Timer and the DRX Inactivity Timer at this moment, but will not stop the timer associated with the retransmission for requiring the terminal to continue monitoring the content of the retransmission. When the DRX Inactivity Timer is overtime or the DRX command MAC control information unit is received, if the short DRX cycle is configured, then the DRX short Cycle Timer is started or restarted, and the short DRX cycle is used; otherwise; the long DRX cycle is used; if the DRX short Cycle Timer is overtime, then the long DRX cycle is used.

The starting point of setting two-stage DRX Cycle is thinking that the possibility of transmitting the data again once after one data transmission process is finished is relatively high, so a short DRX cycle is set to deal with the kind of probability; when there is no data to transmit during several short DRX cycles, this illustrates that the data transmission is finished really, and it may enter into the deep sleep state; in this way, the cooperation of the long and short cycles can reach better DRX effect.

The above-mentioned are the definitions of different timers in the DRX mechanism and the DRX execution procedure explained by taking the LTE system as examples. The DRX mechanism can also be applied to other systems, such as the Universal Mobile Telecommunications System (UMTS) or the Global System of Mobile communication (GSM), etc. The specific execution detail has some difference, but the general procedure is similar.

With the popularization of the intellectual mobile phone and the diversification of the intellectual software and application, the optimization demand on the terminal power consumption becomes a problem required to pay more and more attention to at present. For the present hot application, such as, the instant communication software, the generation of its data has the characteristic that it is random and the data bulk is less, that is, each data transmission (usually one data transmission includes a plurality of application layer data packets produced continuously each time, for example, it will download a plurality of embedded objects to click the webpage link once) includes less serial data packet, and the interval time of earlier and later transmitting the data is longer; when the current DRX mechanism replies to this type of business, after one data transmission is finished, there actually are no any data required to be transmitted (because of the interval time for transmitting the next data is longer) in the several short DRX cycles performed by the DRX mechanism); because the short DRX cycle needs the UE to consume more power as to the long DRX cycle, the DRX technology cannot be well adapted to the instant communication business. And also because the related technology cannot distinguish the instant communication business and other data business (except the speech business), if the number of times of configuration of the short DRX cycle is reduced simply, then it is possible that it is not adapted to other types of data business. If the network dynamically adjusts the configuration of the short DRX cycle through measuring the data regular, it will cause extra signaling expenses of the RRC configuration, and influence the efficiency of the system.

SUMMARY

The embodiment of the present document provides a method for dynamically configuring Discontinuous Reception (DRX) executed by the terminal, such that the terminal meets the power saving demand of different data services.

The present document provides a method for dynamically configuring Discontinuous Reception (DRX), comprising:
a terminal (UE) receiving a DRX cycle using instruction transmitted by a base station; and
if the UE determines that the received DRX cycle using instruction is a long DRX cycle using instruction, then using a long DRX cycle.

Preferably, the UE uses the long DRX cycle, comprising: the UE using the long DRX cycle statically according to content of a long DRX cycle using instruction or according to an agreed configuration with a network side; wherein, the using the long DRX cycle statically refers to that the UE stops using a short DRX cycle and uses the long DRX cycle all the time.

Preferably, the UE uses the long DRX cycle, comprising: the UE using the long DRX cycle dynamically according to the content of the long DRX cycle using instruction or according to the agreed configuration with the network side; wherein, the using the long DRX cycle dynamically refers to that the UE only stops using the short DRX cycle and only uses the long DRX cycle in a preset time, and resumes using the short DRX cycle after the preset time is arrived.

Preferably, the method further comprises: if the terminal determines that the received DRX cycle using instruction is a short DRX cycle using instruction, then using the short DRX cycle.

The embodiment of the present document further provides a terminal for realizing dynamically configuring Discontinuous Reception (DRX), comprising a receiving module and a DRX module, wherein:
the receiving module is configured to receive a DRX cycle using instruction transmitted by a base station; and
the DRX module is configured to: if determining that the DRX cycle using instruction received by the receiving module is a long DRX cycle using instruction, then use a long DRX cycle.

Preferably, the DRX module is configured to use the long DRX cycle by adopting the following way: using the long DRX cycle statically according to content of a long DRX cycle using instruction or according to an agreed configuration with a network side; wherein, the using the long DRX cycle statically refers to that the UE stops using a short DRX cycle and uses the long DRX cycle all the time.

Preferably, the DRX module is configured to use the long DRX cycle statically by adopting the following way, comprising: using the long DRX cycle dynamically according to the content of the long DRX cycle using instruction or according to the agreed configuration with the network side; wherein, the using the long DRX cycle dynamically refers to stopping using the short DRX cycle and only using the long DRX cycle only in a preset time, and resuming using the short DRX cycle after the preset time is arrived.

Preferably, the DRX module is further configured to: if the received DRX cycle using instruction is determined as a short DRX cycle using instruction, then use the short DRX cycle.

The embodiment of the present document further provides a method for dynamically configuring Discontinuous Reception (DRX) executed by a base station, which can dynamically configure the DRX cycle with low expenses, for the terminal to meet the power saving demand of different data services.

The embodiment of the present document provides a method for dynamically configuring Discontinuous Reception (DRX), comprising a judgment module and a transmission module, wherein:

a base station transmitting a long DRX cycle using instruction to a terminal (UE) when determining that the UE needs to use the long DRX cycle according to a data arriving regular of the UE.

Preferably, the long DRX cycle using instruction comprises: a statically valid long DRX cycle using instruction or a dynamically valid long DRX cycle using instruction.

Preferably, the method further comprises: transmitting a short DRX cycle using instruction to the UE when the base station determines that the UE needs to use the short DRX cycle according to the data arriving regular of the UE.

The embodiment of the present document provides a base station for realizing dynamically configuring Discontinuous Reception (DRX), comprising a judgment module and a transmission module, wherein:

the judgment module is configured to judge whether a terminal (UE) needs to use a long DRX cycle according to a data arriving regular of the UE; and the transmission module is configured to transmit a long DRX cycle using instruction to the UE when the judgment module determines that the UE needs to use the long DRX cycle.

Preferably, the long DRX cycle using instruction comprises: a statically valid long DRX cycle using instruction or a dynamically valid long DRX cycle using instruction.

Preferably, the judgment module is further configured to judge whether the UE needs to use a short DRX cycle according to the data arriving regular of the UE; and the transmission module is further configured to transmit a short DRX cycle using instruction to the UE when the judgment module determines that the UE needs to use the short DRX cycle.

By adopting the method, the terminal and the base station of the embodiment of the present document, it can better develop the effect of the DRX. For the network side, it can dynamically configure the DRX cycle with low expenses; for the terminal, it can better meet the power saving demand of different data services; the method is convenient and flexible, and is simple to realize.

PREFERRED EMBODIMENTS OF THE PRESENT DOCUMENT

The embodiment of the present document is described in detail with reference to the accompanying drawings hereinafter. It should be illustrated that, in the case of not conflicting, the embodiments in the present application and features in these embodiments can be combined with each other.

Embodiment One

Figure 1:
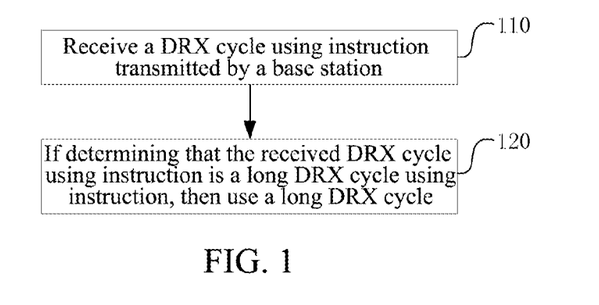
FIG. 1 is a flow chart of embodiment one of the present document.
Figure 2:
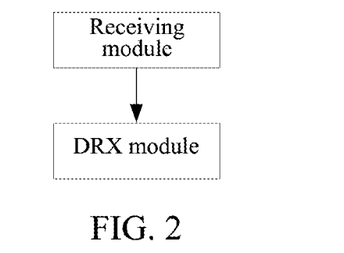
FIG. 2 is a structure diagram of a terminal side according to embodiment two of the present document.

The present embodiment describes the processing executed by the terminal side in the method for dynamically configuring Discontinuous Reception (DRX), as shown in FIG. 1, including the following steps:

in step 110, a DRX cycle using instruction transmitted by a base station is received;

in step 120, if determining that the received DRX cycle using instruction is a long DRX cycle using instruction, then a long DRX cycle is used (for example, the long DRX cycle is statically used or dynamically used).

Preferably, if determining that the received DRX cycle using instruction is the short DRX cycle using instruction, then the UE uses the short DRX cycle.

The UE uses the long DRX cycle statically or uses the long DRX cycle dynamically according to the content of the long DRX cycle using instruction or according to an agreed configuration with a network side. If the content of the long DRX cycle using instruction indicates that the long DRX cycle using instruction is statically valid, then the UE uses the long DRX cycle statically; if the content of the long DRX cycle using instruction indicates that the long DRX cycle using instruction is dynamically valid, then the UE uses the long DRX cycle dynamically. If the UE and the network side agree that the long DRX cycle is configured to be used statically or dynamically, then it is processed according to the agreed configuration after receiving the long DRX cycle using instruction. When the base station sets the long DRX cycle instruction as dynamically valid, then the short DRX cycle instruction may not be required, that is to say, the short DRX cycle instruction is alternative.

The UE uses the long DRX cycle statically, referring to that the UE stops using the short DRX cycle and uses the long DRX cycle all the time after the UE receives the statically valid long DRX cycle using instruction.

According to the difference of the current states of the UE, the situations that the UE uses the long DRX cycle statically are different as well.

If the UE is using the short DRX cycle when the UE receives the statically valid long DRX cycle using instruction, then the UE stops using the short DRX cycle, after a current short DRX cycle is completed, to use the long DRX cycle all the time.

If a DRX Inactivity Timer is running when the UE receives the statically valid long DRX cycle using instruction, then the UE stops using the short DRX cycle, after the DRX Inactivity Timer is overtime or the UE receives the DRX command MAC CE, to use the long DRX cycle all the time.

If the UE is using the long DRX cycle when the UE receives the statically valid long DRX cycle using instruction, then the UE stops using the short DRX cycle, after the DRX Inactivity Timer is overtime next time or the DRX command MAC CE is received next time, to use the long DRX cycle all the time.

For the UE, the effects of the DRX Inactivity Timer being overtime and receiving the DRX command MAC CE are same.

The UE using the long DRX cycle dynamically refers to that: the UE stops using the short DRX cycle and only uses the long DRX cycle only in a preset time after the UE receives the dynamically valid long DRX cycle using instruction, and resumes using the short DRX cycle after the preset time is arrived. The preset time can be: an integral multiple time of a subframe; or an integral multiple time of the long DRX cycle; or the number of times that the DRX Inactivity Timer is overtime or the number of times that the UE receives the DRX command MAC CE. The preset time can be configured to the UE by the base station through a radio resource control (RRC) dedicated signaling or a media access control (MAC) signaling. For example: the preset time is carried by newly building an IE in the existing RRC signaling; or carried through newly building a RRC signaling; or carried in the reserved bits of the existing MAC CE; or carried through newly building the MAC CE.

The UE judges whether the preset time is arrived through setting a dynamic long DRX cycle using timer. The dynamic long DRX cycle using timer starts to count when the UE starts to use the long DRX cycle after the UE receives the dynamically valid long DRX cycle using instruction; or starts to count when the DRX stop timer is overtime first time or the UE receives the DRX command MAC CE first time after the UE starts to use the long DRX cycle.

If the preset time is set as the integral multiple time of the subframe, then the dynamic long DRX cycle using timer is added by 1 when passing every one or more (depending on the setting) subframes.

If the preset time is set as the way of the integral multiple time of the long DRX cycle, the dynamic long DRX cycle using timer is added by 1 when using every one or more (depending on the setting) DRX long cycle.

If the preset time is set as the number of times that the DRX Inactivity Timer is overtime or the number of times that the UE receives the DRX command MAC CE, then the dynamic long DRX cycle using timer is added by 1 when every one or more times that the DRX Inactivity Timer is overtime for the UE or every one or more times when the UE receives the DRX command MAC CE.

According to the difference of the current states of the UE, the situations that the UE uses the long DRX cycle dynamically are different as well.

If the UE is using the short DRX cycle when the UE receives the dynamically valid long DRX cycle using instruction, then the UE stops using the short DRX cycle to use the long DRX cycle when a next DRX cycle starts, and the UE resumes using the short DRX cycle when the DRX Inactivity Timer is overtime last time or the DRX command MAC CE is received last time after the preset time is arrived.

If the DRX Inactivity Timer is running when the UE receives the dynamically valid long DRX cycle using instruction, then the UE stops using the short DRX cycle to use the long DRX cycle after the DRX Inactivity Timer is overtime or the UE receives the DRX command MAC CE, and resumes using the short DRX cycle when the DRX Inactivity Timer is overtime last time or the DRX command MAC CE is received last time after the preset time is arrived.

If the UE is using the long DRX cycle when the UE receives the dynamically valid long DRX cycle using instruction, then the UE stops using the short DRX cycle to use the long DRX cycle after the DRX Inactivity Timer is overtime next time or the DRX command MAC CE is received next time; and resumes using the short DRX cycle when the DRX Inactivity Timer is overtime last time or the DRX command MAC CE is received last time after the preset time is arrived. Or the UE also can regard the instruction as invalid.

The above-mentioned UE stopping using the short DRX cycle includes: the UE setting a DRX short cycle timer as 0 or as overtime.

Except the above-mentioned description that the UE resumes using the short DRX cycle after the preset time is arrived, when the preset time is not arrived, the UE can also resume using the short DRX cycle when any of the following two situations appears.

In situation one: the UE receives the short DRX instruction after receiving the long DRX cycle using instruction, that is to say, after the UE receives the short DRX cycle using instruction, if the UE determines that the long DRX cycle using instruction is received before this (that is, before receiving the short DRX cycle using instruction), then the UE thinks that the long DRX cycle using instruction fails, and the UE resumes using the short DRX cycle.

In situation two: the UE receives the RRC connection reconfiguration signaling including the short DRX cycle configuration parameter, if the UE receives the long DRX cycle using instruction before this (that is, before receiving the RRC connection reconfiguration signaling), then the UE thinks that the long DRX cycle using instruction fails, and the UE uses the short DRX cycle according to the short DRX cycle configuration parameter included in the RRC connection reconfiguration signaling.

When the above-mentioned UE uses the short DRX cycle, when the UE determines that the DRX Inactivity Timer is overtime or when the UE receives the DRX command MAC CE, the UE uses the short DRX cycle. The opportunities of resuming using the short DRX cycle and using the short DRX cycle are the same.

Embodiment Two

Figure 3:
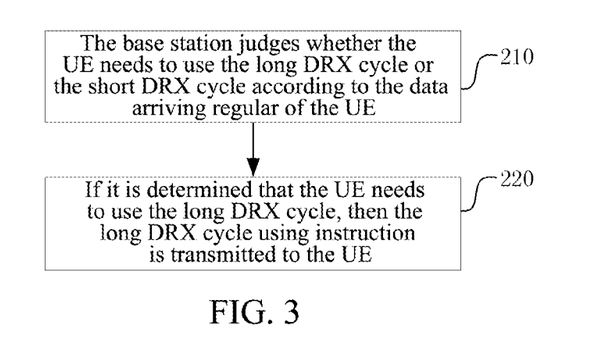
FIG. 3 is a flow chart of embodiment three of the present document.

The present embodiment describes a terminal for realizing the above-mentioned method, as shown in FIG. 3, including a receiving module and a DRX module, wherein:

the receiving module is configured to receive a DRX cycle using instruction transmitted by a base station; and the DRX module is configured to: if determining that the DRX cycle using instruction received by the receiving module is a long DRX cycle using instruction, then use a long DRX cycle.

Preferably, the DRX module is configured to use the long DRX cycle by adopting the following way: using the long DRX cycle statically according to content of a long DRX cycle using instruction or according to an agreed configuration with a network side; wherein, the using the long DRX cycle statically refers to that the UE stops using a short DRX cycle and uses the long DRX cycle all the time.

If the current terminal is using the short DRX cycle when the receiving module receives the long DRX cycle using instruction, then the DRX module is configured to use the long DRX cycle statically by adopting the following way: stopping using the short DRX cycle, after a current short DRX cycle is completed, to use the long DRX cycle all the time.

If the DRX Inactivity Timer of the current terminal is running when the receiving module receives the long DRX cycle using instruction, then the DRX module is configured to use the long DRX cycle statically by adopting the following way: stopping using the short DRX cycle, after the DRX Inactivity Timer is overtime or the DRX command MAC CE is received, to use the long DRX cycle all the time.

If the current terminal is using the long DRX cycle when the receiving module receives the long DRX cycle using instruction, then the DRX module is configured to use the long DRX cycle statically by adopting the following way: stopping using the short DRX cycle, after the DRX Inactivity Timer is overtime next time or the DRX command MAC CE is received next time, to use the long DRX cycle all the time.

Preferably, the DRX module is configured to use the long DRX cycle statically by adopting the following way: using the long DRX cycle dynamically according to the content of the long DRX cycle using instruction or according to the agreed configuration with the network side; wherein, the using the long DRX cycle dynamically refers to stopping using the short DRX cycle and only using the long DRX cycle only in a preset time, and resuming using the short DRX cycle after the preset time is arrived. The preset time can be: an integral multiple time of a subframe; or an integral multiple time of the long DRX cycle; or the number of times of overtime of the DRX stop timer or the number of times that the UE receives the DRX command MAC CE.

The receiving module is further configured to receive the preset time configured and given by the base station through the RRC dedicated signaling or the MAC signaling; and now the terminal further includes a dynamic long DRX cycle using timer module, used for judging whether the preset time is arrived, wherein, the dynamic long DRX cycle using timer module starts to count when the UE starts to use the long DRX cycle; or starts to count when the DRX Inactivity Timer is overtime first time or the DRX command MAC CE is received first time after a UE starts to use the long DRX cycle.

If the current terminal is using the short DRX cycle when the receiving module receives the long DRX cycle using instruction, then the DRX module is configured to use the long DRX cycle dynamically by adopting the following way: the UE stopping using the short DRX cycle to use the long DRX cycle when a next DRX cycle starts, and resuming using the short DRX cycle when the DRX Inactivity Timer is overtime last time or the DRX command MAC CE is received last time after the preset time is arrived.

If the DRX Inactivity Timer of the current terminal is running when the receiving module receives the long DRX cycle using instruction, then the DRX module is configured to use the long DRX cycle dynamically by adopting the following way: stopping using the short DRX cycle to use the long DRX cycle after the DRX Inactivity Timer is overtime or the UE receives the DRX command MAC CE, and resuming using the short DRX cycle when the DRX Inactivity Timer is overtime last time or the DRX command MAC CE is received last time after the preset time is arrived.

If the current terminal is using the long DRX cycle when the receiving module receives the long DRX cycle using instruction, then the DRX module is configured to use the long DRX cycle dynamically by adopting the following way: stopping using the short DRX cycle to use the long DRX cycle after the DRX Inactivity Timer is overtime next time or the DRX command MAC CE is received next time; and resuming using the short DRX cycle when the DRX Inactivity Timer is overtime last time or the DRX command MAC CE is received last time after the preset time is arrived.

Preferably, the DRX module is further configured to: if determining that the received DRX cycle using instruction is a short DRX cycle using instruction, then use the short DRX cycle; and use the short DRX cycle when determining that the DRX Inactivity Timer is overtime or the UE receives the DRX command MAC CE.

Preferably, the DRX module is further configured to: after the receiving module receives the short DRX cycle using instruction, determine that the long DRX cycle using instruction is received before receiving this short DRX cycle using instruction, and then think that the long DRX cycle using instruction fails, and resume using the short DRX cycle.

Preferably, the receiving module is further configured to receive a RRC connection reconfiguration signaling including a short DRX cycle configuration parameter; and the DRX module is further configured to: after the receiving module receives the long DRX cycle using instruction and receives the RRC connection reconfiguration signaling including the short DRX cycle configuration parameter, think that the long DRX cycle using instruction fails, and use the short DRX cycle according to the short DRX cycle configuration parameter included in the RRC connection reconfiguration signaling.

The above-mentioned DRX module stops using the short DRX cycle, including: setting a DRX short cycle timer as 0 or as overtime.

Embodiment Three

The present embodiment describes the processing executed by the base station side in the method for dynamically configuring Discontinuous Reception (DRX), as shown in FIG. 3, including the following steps:

in step 210, the base station judges whether the UE needs to use the long DRX cycle or the short DRX cycle according to the data arriving regular of the UE;

the data arriving regular includes frequency and/or interval of the arriving of data;

in step 220, if it is determined that the UE needs to use the long DRX cycle, then the long DRX cycle using instruction is transmitted to the UE.

Preferably, when the base station determines that the UE needs to use the short DRX cycle according to the data arriving regular of the UE, then the short DRX cycle using instruction is transmitted to the UE.

The base station, in the present embodiment, refers to eNodeB (evolved NodeB) for the LTE system, and refers to the Radio Network Controller (RNC) for the UMTS system.

The base station can carry the above-mentioned long DRX cycle using instruction or short DRX cycle using instruction through the RRC dedicated signaling, for example, carrying through newly building the IE in the existing RRC signaling, or carrying through newly building the RRC signaling. Or the base station can also carry the long DRX cycle using instruction or the short DRX cycle using instruction through the MAC signaling, for example, carrying in the reserved bits of the existing MAC CE, or carrying through newly building the MAC CE.

Preferably, if the base station determines that the UE needs to use the short DRX cycle, then before or after step 220, the base station can also transmit the RRC connection reconfiguration signaling including the short DRX cycle configuration parameter to the UE for indicating the UE to use the short DRX cycle according to the short DRX cycle configuration parameter.

As described in embodiment one, the long DRX cycle using instruction transmitted by the base station can be statically valid, or dynamically valid. The network side and the UE can agree in advance to only use the statically valid long DRX cycle using instruction, or only use the dynamically valid long DRX cycle using instruction, or use both two long DRX cycle using instructions, to indicate that the long DRX cycle using instruction is statically valid or dynamically valid through the content of the long DRX cycle using instruction.

For a same UE, the base station will transmit only one long DRX cycle using instruction at the same moment, but for a base station, it can transmit different kinds of long DRX cycle using instructions to different UEs at the same time, or transmit different kinds of long DRX cycle using instructions to the same UE at different moments.

Embodiment Four

Figure 4:
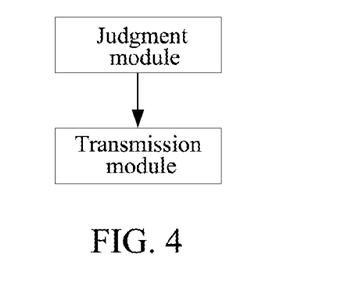
FIG. 4 is a structure diagram of a base station side according to embodiment four of the present document.

The present embodiment describes a base station for realizing the method in the above-mentioned embodiment three, as shown in FIG. 4, including a judgment module and a transmission module, wherein:

the judgment module is configured to judge whether a terminal (UE) needs to use a long DRX cycle according to a data arriving regular of the UE; and the transmission module is configured to transmit a long DRX cycle using instruction to the UE when the judgment module determines that the UE needs to use the long DRX cycle.

Preferably, the long DRX cycle using instruction comprises: a statically valid long DRX cycle using instruction or a dynamically valid long DRX cycle using instruction. Both the statically valid long DRX cycle using instruction and the dynamically valid long DRX cycle using instruction can be transmitted through the RRC dedicated signaling or the MAC signaling.

Preferably, the judgment module is further configured to judge whether the UE needs to use a short DRX cycle according to the data arriving regular of the UE; and the transmission module is further configured to transmit a short DRX cycle using instruction to the UE when the judgment module determines that the UE needs to use the short DRX cycle.

Preferably, the transmission module is further configured to transmit a RRC connection reconfiguration signaling including a short DRX cycle configuration parameter to the UE, used for indicating the UE to use the short DRX cycle according to the short DRX cycle configuration parameter. It can be transmitted through the RRC dedicated signaling or the MAC signaling.

Application Example

The scene of this example is a LTE system.

It is assumed that the UE switches from using an online game service to using an instant messaging service (e.g., MSN).

Figure 5:
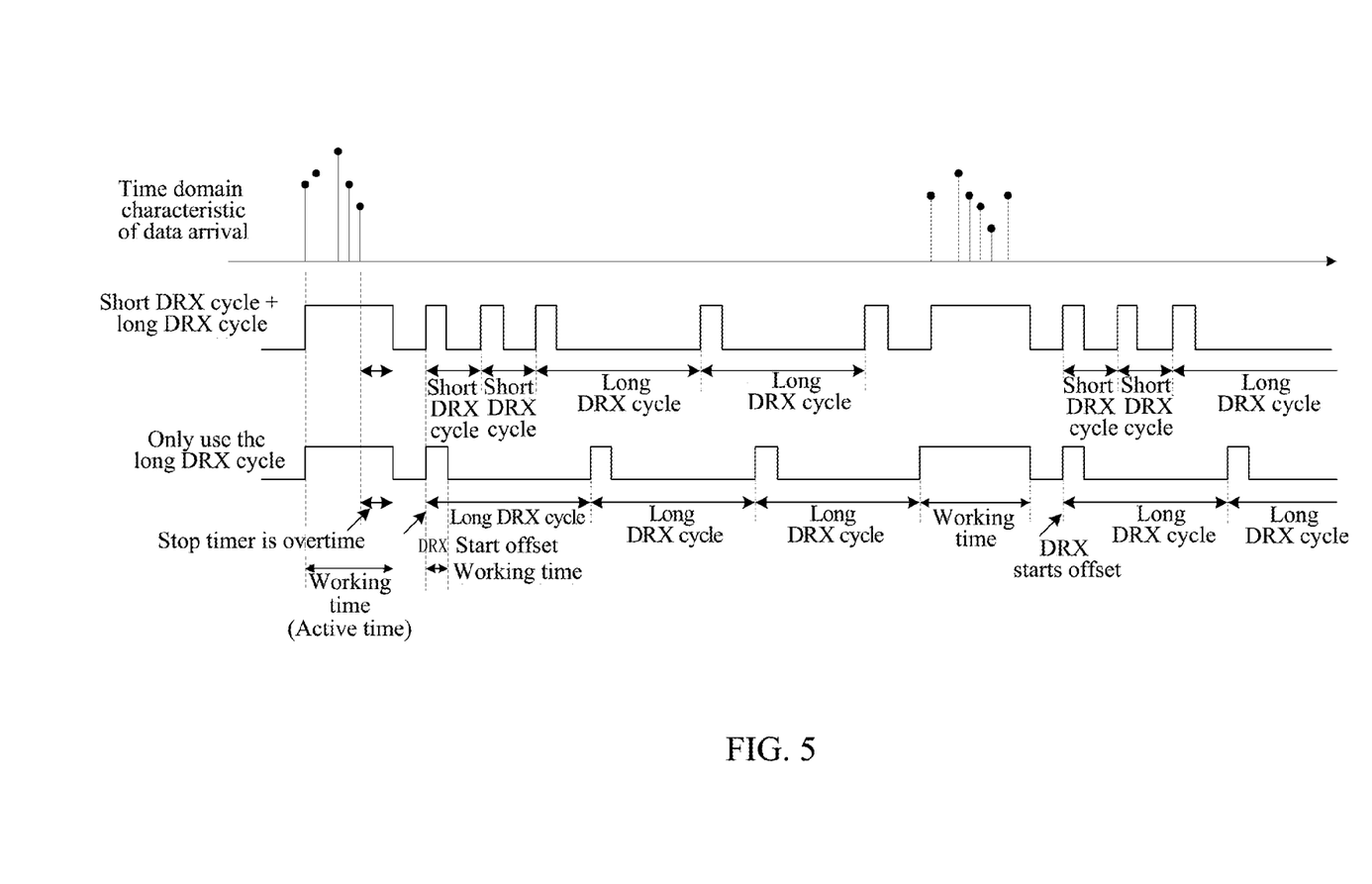
FIG. 5 is a an effect contrast diagram of a scheme of an embodiment of the present document and the related art.

The base station detects that the time interval between each of aggregates of data is longer, and the time interval of each data packet within the aggregate of data is shorter, which is illustrated by the arrival of the data in FIG. 5.

It is assumed that the base station configures a short DRX cycle for the UE, wherein DRX Short Cycle Timer=2, i.e., before executing the long DRX cycle, the short DRX cycle is needed to be firstly executed repeatedly twice. A schematic diagram of using the short DRX cycle and the long DRX cycle cooperatively is shown in FIG. 5 "short DRX cycle+long DRX cycle". It can be seen that no data arrive during executing the short DRX cycle.

By detecting, the base station can calculate easily the probability of data of arrival during executing the short DRX cycle. If the base station finds that the probability is small, then it can adopt the method of the above embodiments that the using of the short DRX cycle is suspended and only the long DRX cycle is used, the effect diagram of which is shown in FIG. 5 "only long DRX cycle".

Comparing the "short DRX cycle+long DRX cycle" with the "only long DRX cycle", it can be seen easily that the UE's Active time (i.e., the time that the UE needs to monitor the PDCCH) in the "only long DRX cycle" is obviously less than that in the "short DRX cycle+long DRX cycle"; that is to say, under the current scene, the "only long DRX cycle" can obtain the better power saving effect than the "short DRX cycle+long DRX cycle".

If the long DRX cycle using instruction transmitted by the base station is valid statically, then the UE performs different processes according to the opportunity of receiving the instruction.

Figure 6:
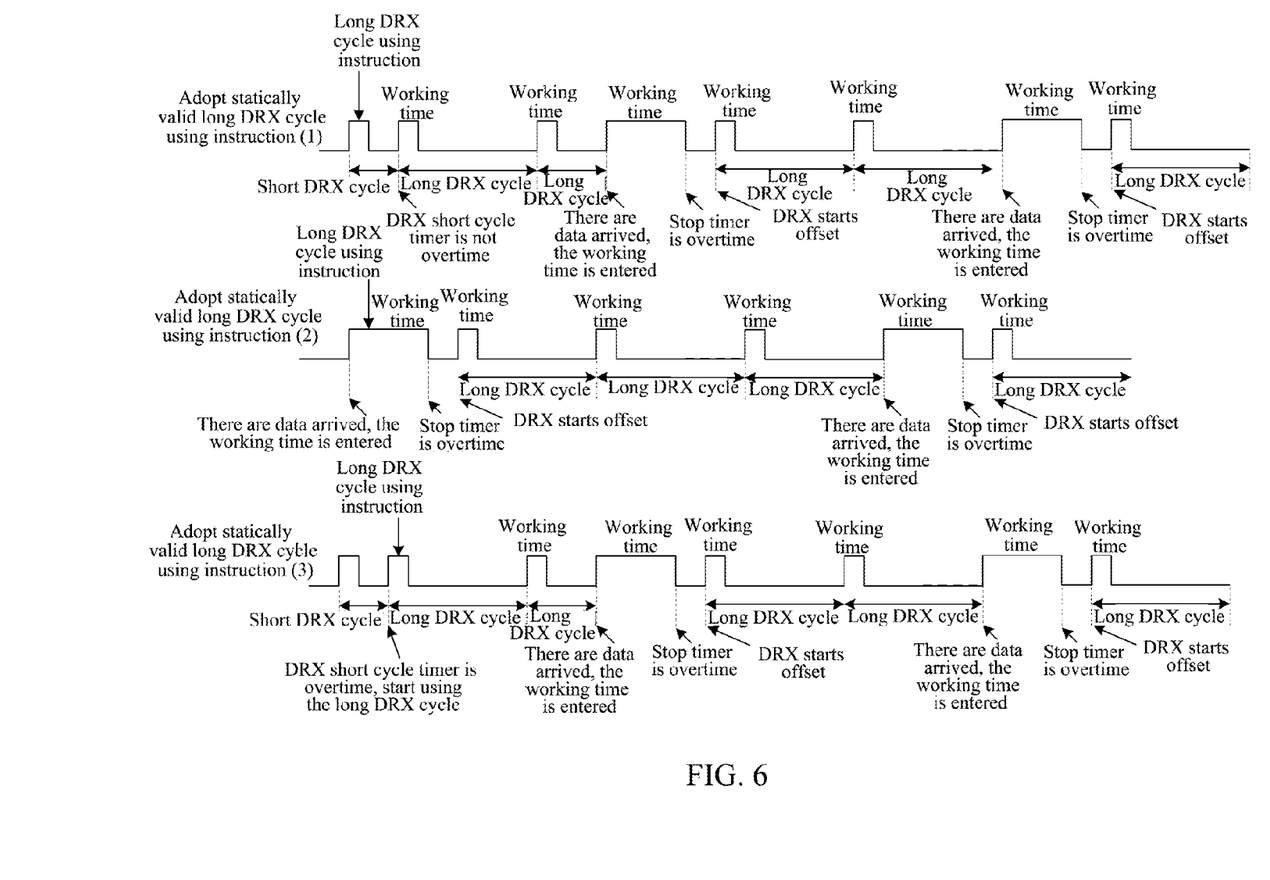
FIG. 6 is a diagram of using a statically valid long DRX cycle using instruction in an embodiment of the present document.

When the UE receives the long DRX cycle using instruction which is valid statically, and if the UE is using the short DRX cycle, the UE stops using the short DRX cycle after a current short DRX cycle is completed, and latter uses the long DRX cycle all the time;

for example: as shown by a subgraph "adopting the long DRX cycle using instruction which is valid statically (1)" in FIG. 6, when at the Active time of the short DRX cycle the UE receives the long DRX cycle using instruction which is valid statically, even though the DRX short Cycle Timer is not overtime at this time (i.e., the number of times of the short DRX cycle are not executed completely), the UE uses the long DRX cycle immediately after the current short DRX cycle is completed.

When the UE receives the long DRX cycle using instruction which is valid statically, and if a DRX Inactivity Timer is running, after the DRX Inactivity Timer is overtime or the UE receives a DRX command MAC CE, the UE stops using the short DRX cycle and uses the long DRX cycle all the time;

for example: as shown by a subgraph "adopting the long DRX cycle using instruction which is valid statically (2)" in FIG. 6, when the UE has the data to receive and transmit and at this time the DRX Inactivity Timer is running, and if at this time the UE receives the long DRX cycle using instruction which is valid statically, then the UE directly uses the long DRX cycle after the DRX Inactivity Timer is overtime; and if the UE receives the DRX command MAC CE when the DRX Inactivity Timer is running, the UE also changes to use the long DRX cycle all the time.

When the UE receives the long DRX cycle using instruction which is valid statically, and if the UE is using the long DRX cycle, after the next DRX Inactivity Timer is overtime or the UE receives a DRX command MAC CE, the UE stops using the short DRX cycle and uses the long DRX cycle all the time;

for example: as shown by a subgraph "adopting the long DRX cycle using instruction which is valid statically (3)" in FIG. 6, when the UE is at the long DRX cycle, and if receiving the long DRX cycle using instruction which is valid statically, then the UE directly uses the long DRX cycle after the later DRX Inactivity Timer is overtime or the UE receives the DRX command MAC CE.

If the long DRX cycle using instruction transmitted by the base station is valid dynamically, after the UE receives the long DRX cycle using instruction which is valid dynamically, it stops using the short DRX cycle and just uses the long DRX cycle only within a preset time, and it resumes using the short DRX cycle after the preset time has arrived. The preset time can be the integral multiple of a subframe, or can be the integral multiple of the long DRX cycle, or can be the number of times of the DRX Inactivity Timer being overtime or the UE receiving the DRX command MAC CE, which is agreed by the network side and the UE in advance.

During implementing, the base station configures the preset time for the UE through a RRC dedicated signaling or a MAC signaling.

After the UE receives the long DRX cycle using instruction which is valid dynamically, the UE sets that a dynamic long DRX cycle using timer starts to count when the UE starts to use the long DRX cycle; or after the UE starts to use the long DRX cycle, and when the DRX Inactivity Timer is overtime for the first time or the UE receives the DRX command MAC CE for the first time, the UE sets that the dynamic long DRX cycle using timer starts to count.

If the preset time is set by adopting the way of the integral multiple of the subframe, then the dynamic long DRX cycle using timer is added by 1 when passing every one subframe, or the dynamic long DRX cycle using timer can be added by 1 after passing multiple subframes;

if the preset time is set by adopting the way of the integral multiple of the long DRX cycle, then the dynamic long DRX cycle using timer is added by 1 when the UE uses every one DRX long cycle, or can be added by 1 after passing several DRX long cycles;

if the preset time is set by adopting the way of the number of times of the DRX Inactivity Timer being overtime or the UE receiving the DRX command MAC CE, then the dynamic long DRX cycle using timer is added by 1 every time the UE goes through the DRX Inactivity Timer being overtime or the UE receives the DRX command MAC CE, or can be added by 1 after going through the DRX Inactivity Timer being overtime for several times, or can be added by 1 after the UE receives the DRX command MAC CE for several times.

Hereinafter the present document is illustrated by taking the preset time being the number of times of the DRX Inactivity Timer being overtime or the UE receiving the DRX command MAC CE as an example, and the other two ways of the preset time can be realized by reference.

The base station can add DynamicalLongDRXCycleEnableTimer in the DRX configuration parameter of IE MAC-MainConfig of the existing RRC signaling RRCConnectionReconfiguration, which can be find in the following example:

```
DRX-Config ::=      CHOICE {
   release             NULL,
   setup               SEQUENCE {
     onDurationTimer     ENUMERATED {
                           psf1, psf2, psf3, psf4, psf5, psf6,
                           psf8, psf10, psf20, psf30, psf40,
                           psf50, psf60, psf80, psf100,
                           psf200},
     ......
     DynamicalLongDRXCycleEnableTimer  INTEGER (1..64)
     ......
   }
}
```

Wherein, the DynamicalLongDRXCycleEnableTimer is the preset time, whose value range should be agreed by the network side and the UE in advance, and the above-mentioned 1~64 are only for example.

Or, the base station can transmit the preset time in the MAC signaling, for example, a new MAC CE can be added to carry the preset time, whose value range is assumed to be 1~64, then the new MAC CE needs only one Byte length. A name of DynamicalLongDRXCycleEnableTimer is added correspondingly in the existing LCID (Logical Channel ID) table (refer to Table 1), for remaindering the UE that the MAC CE referred to as DynamicalLongDRXCycleEnableTimer is included in the MAC PDU (Protocol Data Unit). After the UE read this LCID, it knows that the corresponding DynamicalLongDRXCycleEnableTimer can be obtained in the received MAC PDU.

TABLE 1

| DL-SCH (Downlink Shared Channel) LCID Table | |
|---|---|
| Serial number | LCID value |
| 00000 | CCCH (Common Control Channel) |
| 00001-01010 | Identity of the logical channel |
| 01011-11001 | Reserved |
| 11010 | DynamicalLongDRXCycleEnableTimer |
| 11011 | ... |

If the long DRX cycle using instruction transmitted by the base station is valid dynamically, the UE performs different processes according to the opportunity of receiving the instruction.

When the UE receives the long DRX cycle using instruction which is valid dynamically, and if the UE is using the short DRX cycle, the UE stops using the short DRX cycle but uses the long DRX cycle at the beginning of the next DRX cycle, and the UE resumes to use the short DRX cycle when the DRX Inactivity Timer is overtime or the UE receives the DRX command MAC CE most recently after the preset time has arrived.

Figure 7:
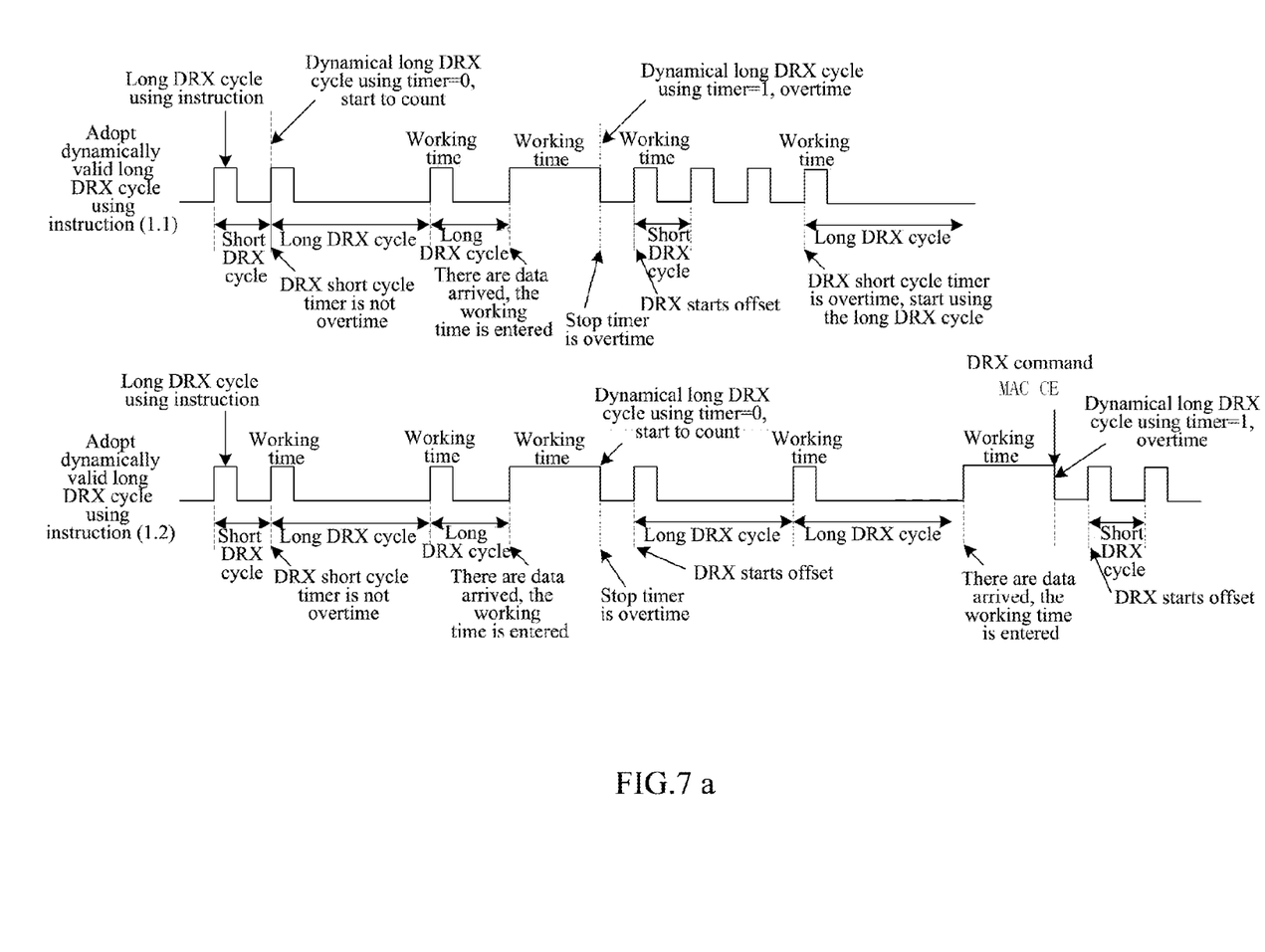
FIG. 7a-7b are diagrams of using a dynamically valid long DRX cycle using instruction in an embodiment of the present document.

For example:

supposing that the DynamicalLongDRXCycleEnableTimer=1 is configured for the UE by the base station. The network side and the UE agree in advance to adopt the number (the number is 1) of overtime of the DRX Inactivity Timer or the number (the number is 1) that the UE receives the DRX command MAC CE (the number is 1) as the Preset Time (same hereinafter), as shown by adopting the dynamically valid long DRX cycle using instruction (1.1) and (1.2) in FIG. 7*a*:

(1.1) and (1.2) are corresponding to the starting timing modes of 2 above-mentioned DynamicalLongDRXCycleEnableTimers respectively. (1.1) is corresponding to that the DynamicalLongDRXCycleEnableTimer starts to time when the UE starts to use the long DRX cycle; and (1.2) is corresponding to that the DynamicalLongDRXCycleEnableTimer starts to time when the DRX Inactivity Timer is overtime first time or the DRX command MAC CE is received by the UE first time after the UE starts to use the long DRX cycle.

As shown by (1.1) and (1.2), since the UE receives the dynamically valid long DRX cycle using instruction, the UE stops using the short DRX cycle and starts to use the long DRX cycle, and the UE resumes using the short DRX cycle after the timing of the DynamicalLongDRXCycleEnableTimer arrives 1 (arrived maximum value or called overtime); it is noticed that both the overtime of the DRX Inactivity Timer or the UE receiving the DRX command MAC CE enable the count of the DynamicalLongDRXCycleEnableTimer be added by 1.

Figure 7B:
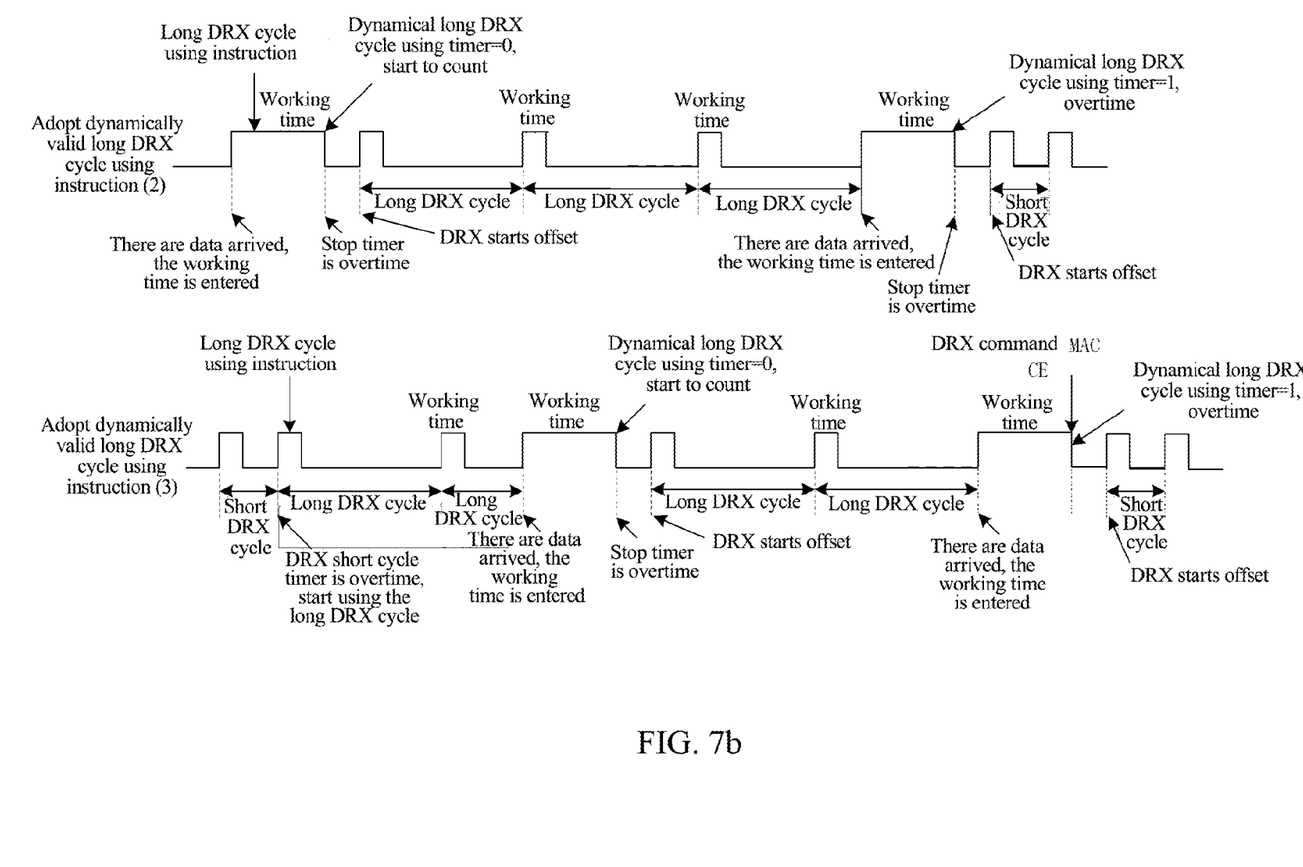

If the DRX Inactivity Timer is running when the UE receives the dynamically valid long DRX cycle using instruction, then the UE stops using the short DRX cycle to use the long DRX cycle after the DRX Inactivity Timer is overtime or the UE receives the DRX command MAC CE, and the UE resumes using the short DRX cycle when the DRX Inactivity Timer is overtime last time or the DRX command MAC CE is received after the preset time is arrived, as shown by adopting the dynamically valid long DRX cycle using instruction (2) in FIG. 7(b).

If the UE is using the long DRX cycle when the UE receives the dynamically valid long DRX cycle using instruction, then the UE stops using the short DRX cycle to use the long DRX cycle after the DRX Inactivity Timer is overtime next time or the DRX command MAC CE is received; and the UE resumes using the short DRX cycle when the DRX Inactivity Timer is overtime last time or the DRX command MAC CE is received after the preset time is arrived, as shown by adopting the dynamically valid long DRX cycle using instruction (3) in FIG. 7(b). In other examples, the UE also can regard the instruction as invalid.

If the UE receives the short DRX cycle using instruction transmitted by the base station, then the UE uses the short DRX cycle.

After the UE receives the short DRX cycle using instruction, if the UE receives the long DRX cycle using instruction before receiving this short DRX cycle using instruction, then the long DRX cycle using instruction fails, and the UE resumes using the short DRX cycle.

Or, after the UE receives the RRC connection reconfiguration signaling including the short DRX cycle configuration parameter, if the UE receives the long DRX cycle using instruction before receiving this short DRX cycle using instruction, then the long DRX cycle using instruction fails, and the UE uses the short DRX cycle according to the short DRX cycle configuration parameter included in the RRC connection reconfiguration signaling.

Figure 8:
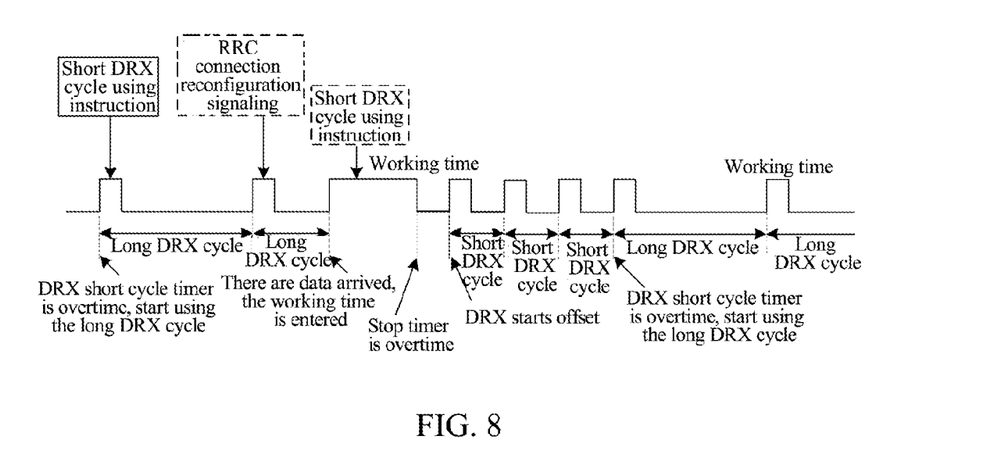
FIG. 8 is a diagram of using a short DRX cycle using instruction in an embodiment of the present document.

For example: as shown in FIG. 8, no matter the UE receives the short DRX cycle using instruction or receives the RRC connection reconfiguration signaling including the short DRX cycle configuration parameter when the UE is using the DRX cycle or the DRX Inactivity Timer is running, the UE resumes using the short DRX cycle after the DRX Inactivity Timer is overtime last time or the UE receives the DRX command MAC CE, which runs according to the existing DRX mechanism: running first according to the running number of the original DRX cycle, then using the long DRX cycle after the DRX short Cycle Timer is overtime.

The difference is that, if the UE receives the short DRX cycle using instruction, then the UE still uses the short DRX cycle according to the original short DRX cycle configuration parameter; if the UE receives the RRC connection reconfiguration signaling including the short DRX cycle configuration parameter, then the UE uses the short DRX cycle according to the short DRX cycle configuration parameter in the RRC connection reconfiguration signaling.

The network side and the UE can agree in advance to only use the statically valid long DRX cycle using instruction, or only use the dynamically valid long DRX cycle using instruction, or use both two long DRX cycle using instructions.

If only the statically valid long DRX cycle using instruction is used or only the dynamically valid long DRX cycle using instruction is used, the long DRX cycle using instruction and the short DRX cycle using instruction can be agreed by adopting the following way:

TABLE 2

| Identification | Corresponding instruction |
| --- | --- |
| 0 | Long DRX cycle using instruction (agreed in advance to adopt the statically valid or dynamically valid) |
| 1 | Short DRX cycle using instruction |

By adopting the method in Table 2, the long DRX cycle using instruction and the short DRX cycle using instruction can be expressed only by 1 bit; Table 2 is only one of the examples, and there can also be other expression methods, as shown in Table 3:

TABLE 3

| Identification | Corresponding instruction |
| --- | --- |
| 00 | Reserved |
| 0 | Long DRX cycle using instruction (agreed in advance to adopt the statically valid or dynamically valid) |
| 1 | Short DRX cycle using instruction |
| 11 | Reserved |

If both two long DRX cycle using instructions are used, then the long DRX cycle using instruction and the short DRX cycle using instruction are expressed by adopting the mode as shown in Table 4:

TABLE 4

| Identification | Corresponding instruction |
| --- | --- |
| 00 | Reserved |
| 01 | Statically valid long DRX cycle using instruction |
| 10 | Dynamically valid long DRX cycle using instruction |
| 11 | Short DRX cycle using instruction |

By adopting the method in Table 4, the statically valid and dynamically valid long DRX cycle using instruction and the short DRX cycle using instruction can be expressed only by 2 bits.

The transmission of the long DRX cycle using instruction or the short DRX cycle using instruction can be carried through the RRC dedicated signaling or the MAC signaling.

Carrying through the RRC dedicated signaling includes: newly building the Information Element (IE) in the existing RRC signaling, for example, the instruction can be carried by newly building the IE in the uplink RRC message, such as, the RRC connection setup complete (RRC) message, the Security mode complete message, the RRC connection reconfiguration complete message, the RRC connection reconfiguration complete message, etc.; Or, a RRC signaling is newly built for carrying.

Carrying through the MAC signaling can be carried in the reserved bits of the existing MAC CE, for example: carrying in the reserved bits of the Timing Advance Command MAC CE.

Figure 9:
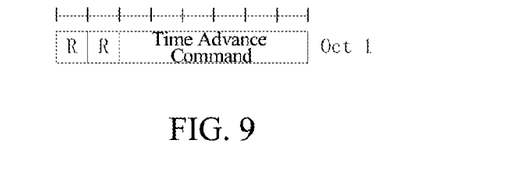
FIG. 9 is a structure diagram of a timing advance command MAC CE.

The structure of the existing Timing Advance Command MAC CE is shown as in FIG. 9.

Its former two reserved bit locations can be used for carrying the long DRX cycle using instruction and the short DRX cycle using instruction.

The network side and the UE agree in advance to use the former two reserved bit locations of the Timing Advance Command MAC CE for carrying the long DRX cycle using instruction and the short DRX cycle using instruction; for example, it can adopt the way in Table 3 or Table 4. If the former two bit locations are 00, then they represent that the long DRX cycle using instruction and the short DRX cycle using instruction are not transmitted; if they are not 00, then they represent that the long DRX cycle using instruction or the short DRX cycle using instruction is transmitted.

Carrying through MAC signaling can also be carrying the long DRX cycle using instruction or the short DRX cycle using instruction through newly building the MAC CE.

For example, designing a new MAC CE only takes one Byte length, and increases the corresponding name DynamicalLongShortDRXCycle (referring to Table 5) in the existing LCID table, used for remaindering the UE that the MAC Protocol Data Unit (PDU) includes the MAC CE which is called DynamicalLongShortDRXCycle, and the UE just knows that it can obtain the corresponding DynamicalLongShortDRXCycle from the received MAC PDU after reading the LCID.

TABLE 5

Downlink Shared Channel LCID Table

| Serial number | LCID value |
| --- | --- |
| 00000 | CCCH (Common Control Channel) |
| 00001-01010 | Identity of the logical channel |
| 01011-11001 | Reserved bit |
| 11010 | DynamicalLongDRXCycleEnableTimer |
| 11011 | . . . |

Also the long DRX cycle using instruction or the short DRX cycle using instruction can be combined with the preset time used by the aforesaid dynamically valid long DRX cycle, carried by one same MAC CE.

The above-mentioned embodiments can also be applied to the UMTS system.

It can be understood by those skilled in the art that all or part of steps in the above-mentioned method can be fulfilled by programs instructing the relevant hardware components, and the programs can be stored in a computer readable storage medium such as a read only memory, a magnetic disk or an optical disk, etc. Alternatively, all or part of the steps in the above-mentioned embodiments can be implemented with one or more integrated circuits. Accordingly, each module/unit in the above-mentioned embodiments can be implemented in the form of hardware, or in the form of software function module. The present document is not limit to any specific form of the combination of the hardware and software.

Certainly, the present document can have a variety of other embodiments. Those skilled in the art can make the corresponding modifications and variations according to the present document without departing from the spirit and essence of the present document. And all of these modifications or the variations should be embodied in the scope of the appending claims of the present document.

INDUSTRIAL APPLICABILITY

The present scheme can better develop the effect of the DRX. For the network side, it can dynamically configure the DRX cycle with low expenses; for the terminal, it can better meet the power saving demand of different data services; the method is convenient and flexible, and is simple to realize.

I claim:

1. A method for dynamically configuring Discontinuous Reception (DRX), comprising:
a terminal (UE) receiving a DRX cycle using instruction transmitted by a base station; and
if the UE determines that a received DRX cycle using instruction is a long DRX cycle using instruction, then using a long DRX cycle; wherein:
the UE uses the long DRX cycle, comprising: the UE using the long DRX cycle statically according to content of the long DRX cycle using instruction or according to an agreed configuration with a network side; wherein, the using the long DRX cycle statically refers to that the UE stops using a short DRX cycle and uses the long DRX cycle all the time;
wherein,
if the UE is using the short DRX cycle when receiving the long DRX cycle using instruction, then the UE uses the long DRX cycle statically, comprising: the UE stopping using the short DRX cycle, after a current short DRX cycle is completed, to use the long DRX cycle all the time;
if a DRX inactivity timer is running when the UE receives the long DRX cycle using instruction, then the UE uses the long DRX cycle statically, comprising: the UE stopping using the short DRX cycle, after the DRX inactivity timer is overtime or the UE receives DRX command media access control layer control information unit (command MAC CE), to use the long DRX cycle all the time;
if the UE is using the long DRX cycle when receiving the long DRX cycle using instruction, then the UE uses the long DRX cycle statically, comprising: the UE stopping using the short DRX cycle, after the DRX inactivity timer is overtime next time or the DRX command MAC CE is received next time, to use the long DRX cycle all the time; and
wherein, the UE stops using the short DRX cycle, comprising: the UE setting a DRX short cycle timer as 0 or as overtime.

2. The method according to claim 1, wherein:
the UE uses the long DRX cycle, comprising: the UE using the long DRX cycle dynamically according to the content of the long DRX cycle using instruction or according to the agreed configuration with the network side; wherein, the using the long DRX cycle dynamically refers to that the UE stops using the short DRX cycle and only uses the long DRX cycle only in a preset time, and resumes using the short DRX cycle after the preset time is arrived.

3. The method according to claim 2, further comprising:
the UE setting a dynamic long DRX cycle using timer to judge whether the preset time is arrived, wherein, the dynamic long DRX cycle using timer starts to count when the UE starts to use the long DRX cycle; or starts to count when the DRX inactivity timer is overtime first time or the DRX command MAC CE is received first time after the UE starts to use the long DRX cycle;
wherein the preset time is: an integral multiple time of a subframe; or an integral multiple time of the long DRX cycle; or a number of times that the DRX inactivity timer is overtime or a number of times that the UE receives the DRX command MAC CE;
or,
the preset time is configured to the UE by the base station through a radio resource control (RRC) dedicated signaling or a media access control (MAC) signaling;
wherein, if the UE is using the short DRX cycle when receiving the long DRX cycle using instruction, then the UE uses the long DRX cycle dynamically, comprising: the UE stopping using the short DRX cycle to use the long DRX cycle when a next DRX cycle starts, and resuming using the short DRX cycle when the DRX inactivity timer is overtime last time or the DRX command MAC CE is received last time after the preset time is arrived;

if the DRX inactivity timer is running when the UE receives the long DRX cycle using instruction, then the UE uses the long DRX cycle dynamically, comprising: the UE stopping using the short DRX cycle to use the long DRX cycle after the DRX inactivity timer is overtime or the UE receives the DRX command MAC CE, and resuming using the short DRX cycle when the DRX inactivity timer is overtime last time or the DRX command MAC CE is received last time after the preset time is arrived;

if the UE is using the long DRX cycle when receiving the long DRX cycle using instruction, then the UE uses the long DRX cycle dynamically, comprising: the UE stopping using the short DRX cycle to use the long DRX cycle after the DRX inactivity timer is overtime next time or the DRX command MAC CE is received next time; and resuming using the short DRX cycle when the DRX inactivity timer is overtime last time or the DRX command MAC CE is received last time after the preset time is arrived.

4. The method according to claim 1, further comprising:
if the DRX cycle using instruction received by the UE is a short DRX cycle using instruction, then using the short DRX cycle;
  wherein, after the UE receives the short DRX cycle using instruction, the method further comprises: the UE determining that the long DRX cycle using instruction is received before receiving this short DRX cycle using instruction, then the UE determining that the long DRX cycle using instruction fails, and the UE resuming using the short DRX cycle;
  or, the UE uses the short DRX cycle, comprising: using the short DRX cycle when the UE determines that the DRX inactivity timer is overtime or the UE receives the DRX command MAC CE.

5. The method according to claim 1, further comprising:
after receiving the long DRX cycle using instruction, the UE receiving a RRC connection reconfiguration signaling including a short DRX cycle configuration parameter, then the UE determining that the long DRX cycle using instruction fails, and the UE using the short DRX cycle according to the short DRX cycle configuration parameter included in the RRC connection reconfiguration signaling.

6. A method for dynamically configuring Discontinuous Reception (DRX), comprising:
a base station transmitting a long DRX cycle using instruction to a terminal (UE) when determining that the UE needs to use the long DRX cycle according to a data arriving regular of the UE;
transmitting a short DRX cycle using instruction to the UE when the base station determines that the UE needs to use the short DRX cycle according to the data arriving regular of the UE;
wherein,
  the base station transmitting a RRC connection reconfiguration signaling including a short DRX cycle configuration parameter to the UE, used for indicating the UE to use the short DRX cycle according to the short DRX cycle configuration parameter;
  the base station transmitting the short DRX cycle using instruction to the UE through the RRC dedicated signaling or the MAC signaling; and the base station comprises: an evolved node B, or a wireless network controller.

7. The method according to claim 6, wherein:
the long DRX cycle using instruction comprises: a statically valid long DRX cycle using instruction or a dynamically valid long DRX cycle using instruction;
the base station comprises: an evolved node B, or a wireless network controller.

8. The method according to claim 6, wherein:
the base station transmitting the long DRX cycle using instruction to the UE through a RRC dedicated signaling or a MAC signaling;
the base station comprises: an evolved node B, or a wireless network controller.

9. A terminal for realizing dynamically configuring Discontinuous Reception (DRX), comprising a processor for executing steps of a receiving module and a DRX module, wherein:
the receiving module is configured to receive a DRX cycle using instruction transmitted by a base station; and
the DRX module is configured to: if determining that the DRX cycle using instruction received by the receiving module is a long DRX cycle using instruction, then use a long DRX cycle; wherein:
the DRX module is configured to use the long DRX cycle by adopting the following way: using the long DRX cycle statically according to content of a long DRX cycle using instruction or according to an agreed configuration with a network side; wherein, the using the long DRX cycle statically refers to that the UE stops using a short DRX cycle and uses the long DRX cycle all the time;
wherein:
  if the terminal is using the short DRX cycle when the receiving module receives the long DRX cycle using instruction, then the DRX module is configured to use the long DRX cycle statically by adopting the following way: stopping using the short DRX cycle, after a current short DRX cycle is completed, to use the long DRX cycle all the time;
  if a DRX inactivity timer of the terminal is running when the receiving module receives the long DRX cycle using instruction, then the DRX module is configured to use the long DRX cycle statically by adopting the following way: stopping using the short DRX cycle, after the DRX inactivity timer is overtime or DRX command media access control layer control information unit (command MAC CE) is received, to use the long DRX cycle all the time;
  if the terminal is using the long DRX cycle when the receiving module receives the long DRX cycle using instruction, then the DRX module is configured to use the long DRX cycle statically by adopting the following way: stopping using the short DRX cycle, after the DRX inactivity timer is overtime next time or the DRX command MAC CE is received next time, to use the long DRX cycle all the time; and
wherein, the DRX module is configured to stop using the short DRX cycle by adopting the following way: setting a DRX short cycle timer as 0 or as overtime.

10. The terminal according to claim 9, wherein:
the DRX module is configured to use the long DRX cycle statically by adopting the following way: using the long DRX cycle dynamically according to the content of the long DRX cycle using instruction or according to the agreed configuration with the network side; wherein, the using the long DRX cycle dynamically refers to stopping using the short DRX cycle and only using the long DRX cycle only in a preset time, and resuming using the short DRX cycle after the preset time is arrived.

11. The terminal according to claim 10, wherein:

the receiving module is further configured to receive the preset time configured and given by the base station through a radio resource control (RRC) dedicated signaling or a media access control (MAC) signaling; and the terminal further comprises a dynamic long DRX cycle using timer module, configured to: judge whether the preset time is arrived, wherein, the dynamic long DRX cycle using timer module starts to count when the UE starts to use the long DRX cycle; or starts to count when the DRX inactivity timer is overtime first time or the DRX command MAC CE is received first time after a UE starts to use the long DRX cycle;

wherein, the preset time is: an integral multiple time of a subframe; or an integral multiple time of the long DRX cycle; or a number of times that the DRX inactivity timer is overtime or a number of times that the UE receives the DRX command MAC CE;

if the terminal is using the short DRX cycle when the receiving module receives the long DRX cycle using instruction, then the DRX module is configured to use the long DRX cycle dynamically by adopting the following way: the UE stopping using the short DRX cycle to use the long DRX cycle when a next DRX cycle starts, and resuming using the short DRX cycle when the DRX inactivity timer is overtime last time or the DRX command MAC CE is received last time after the preset time is arrived;

if the DRX inactivity timer of the terminal is running when the receiving module receives the long DRX cycle using instruction, then the DRX module is configured to use the long DRX cycle dynamically by adopting the following way: stopping using the short DRX cycle to use the long DRX cycle after the DRX inactivity timer is overtime or the UE receives the DRX command MAC CE, and resuming using the short DRX cycle when the DRX inactivity timer is overtime last time or the DRX command MAC CE is received last time after the preset time is arrived; and if the terminal is using the long DRX cycle when the receiving module receives the long DRX cycle using instruction, then the DRX module is configured to use the long DRX cycle dynamically by adopting the following way: stopping using the short DRX cycle to use the long DRX cycle after the DRX inactivity timer is overtime next time or the DRX command MAC CE is received next time; and resuming using the short DRX cycle when the DRX inactivity timer is overtime last time or the DRX command MAC CE is received last time after the preset time is arrived.

12. The terminal according to claim 9, wherein:

the DRX module is further configured to: if the received DRX cycle using instruction is determined to be a short DRX cycle using instruction, then use the short DRX cycle;

wherein, the DRX module is further configured to: after the receiving module receives the short DRX cycle using instruction, determine that the long DRX cycle using instruction fails, and resume using the short DRX cycle, if determine that the long DRX cycle using instruction is received before this short DRX cycle;

or, the DRX module is configured to use the short DRX cycle by adopting the following way: using the short DRX cycle when determining that the DRX inactivity timer is overtime or the UE receives the DRX command MAC CE.

13. The terminal according to claim 9, wherein:

the receiving module is further configured to receive a RRC connection reconfiguration signaling including a short DRX cycle configuration parameter; and the DRX module is further configured to: after the receiving module receives the long DRX cycle using instruction and receives the RRC connection reconfiguration signaling including the short DRX cycle configuration parameter, determine that the long DRX cycle using instruction fails, and use the short DRX cycle according to the short DRX cycle configuration parameter included in the RRC connection reconfiguration signaling.

14. A base station for realizing dynamically configuring Discontinuous Reception (DRX), comprising a processor for executing steps of a judgment module and a transmission module, wherein:

the judgment module is configured to judge whether a terminal (UE) needs to use a long DRX cycle according to a data arriving regular of the UE; and the transmission module is configured to transmit a long DRX cycle using instruction to the UE when the judgment module determines that the UE needs to use the long DRX cycle; wherein:

the judgment module is further configured to judge whether the UE needs to use a short DRX cycle according to the data arriving regular of the UE; and the transmission module is further configured to transmit a short DRX cycle using instruction to the UE when the judgment module determines that the UE needs to use the short DRX cycle;

wherein, the transmission module is further configured to transmit a RRC connection reconfiguration signaling including a short DRX cycle configuration parameter to the UE for indicating the UE to use the short DRX cycle according to the short DRX cycle configuration parameter;

or, the transmission module is configured to transmit the short DRX cycle using instruction to the UE through the RRC dedicated signaling or the MAC signaling; and the base station is: an evolved node B, or a wireless network controller.

15. The base station according to claim 14, wherein:

the long DRX cycle using instruction comprises: a statically valid long DRX cycle using instruction or a dynamically valid long DRX cycle using instruction; and the base station is: an evolved node B, or a wireless network controller.

16. The base station according to claim 14, wherein:

the transmission module is configured to transmit the long DRX cycle using instruction to the UE through a RRC dedicated signaling or a MAC signaling; and the base station is: an evolved node B, or a wireless network controller.

* * * * *